Oct. 1, 1957     H. J. M. FÖRSTER     2,807,968
DEVICE FOR THE AUTOMATIC CONTROL OF A FRICTION
CLUTCH OR BRAKE OR THE LIKE
Filed Aug. 22, 1950     2 Sheets-Sheet 1
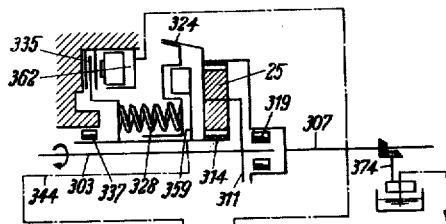
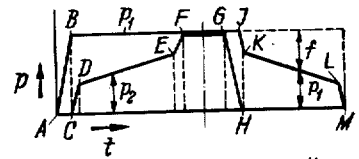
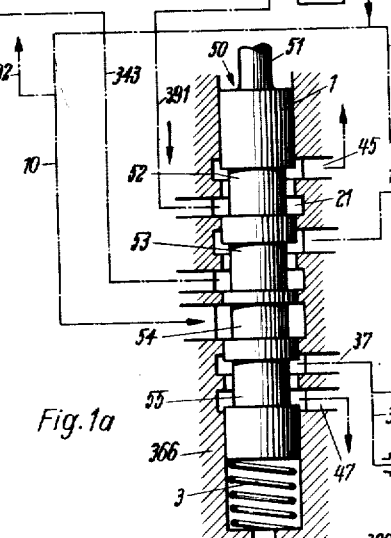
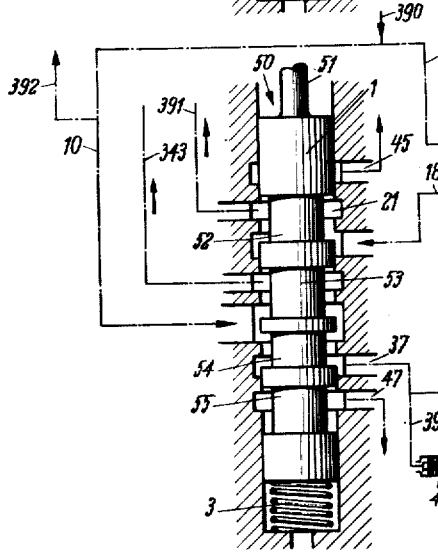
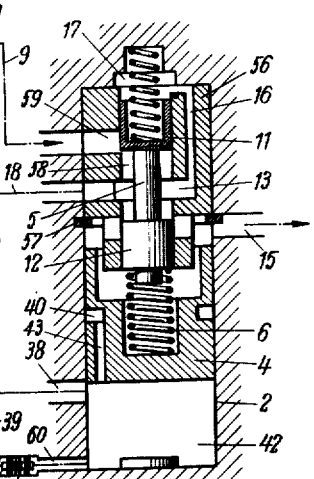
Inventor
Hans Joachim Max Förster
By Dicke and Padlon
Attorneys

United States Patent Office 2,807,968
Patented Oct. 1, 1957

2,807,968

DEVICE FOR THE AUTOMATIC CONTROL OF A FRICTION CLUTCH OR BRAKE OR THE LIKE

Hans J. M. Förster, Harthausen a. F., Kreis Esslingen (Neckar), Germany, assignor to Daimler-Benz Aktiengesellschaft, Stuttgart-Unterturkheim, Germany Application August 22, 1950, Serial No. 180,836

Claims priority, application Germany August 26, 1949

18 Claims. (Cl. 74—781)

My invention relates to a device for the automatic control of friction means such as a clutch or brake or the like, more particularly, for the control of a ratio changing operation in the transmission of motor vehicles.

It is the object of my invention to provide means which will automatically engage and disengage friction means in a strictly controlled manner eliminating any shocks and undue wear and ensuring a smooth and reliable operation.

It is another object of my invention, to provide automatic means for shifting variable speed-transmissions of the type in which various gears can be selected for operation by the actuation of friction means and to provide fluid-controlled means for such actuation.

The term "friction means" as used herein is intended to cover both, a clutch proper and a brake, since the latter functions by clutching a rotary part to a stationary part thereby tending to arrest the rotary part.

The operation of friction means, particularly of the type producing friction on a single pair of contacting faces or on a small number of such pairs involves the problem of controlling the gradual increase of the friction produced in such a manner as to ensure a smooth transfer of motion eliminating any shocks. In fluid-operated friction means the intricacy of this problem is due to the limited volume of the fluid available to produce the actuating force engaging or disengaging the friction means.

Further objects of my invention are to provide means for an accurate timed control of the fluid pressure causing the engagement or disengagement of the friction means; to provide means which in engaging the friction means will first apply a limited pressure sufficient to take up lost motion, will then gradually increase the pressure and the consequent friction until the friction means ceases to slip and will finally put on additional pressure; to provide means causing the friction means to be directly engaged by fluid-pressure, the latter being transferred to the friction means directly or indirectly with or without a reduction or an increase; or, alternatively, to provide a spring or the like producing the force transferred to the friction means and tending to engage the same, fluid pressure being operative to counteract the spring and to permit the same to engage the friction means gradually in a timed manner.

Whereas I prefer to effect the engagement of the friction means gradually to smoothly build up the friction torque transferred to the driven shaft or other member, the disengagement of the friction means may take place abruptly to reduce wear to a minimum.

My invention is primarily applicable to variable speed transmissions including two friction means adapted to be alternately engaged to drive different gears or to arrest same, one of said friction means being disengaged, preferably abruptly, while the other friction means is gradually and smoothly engaged.

Preferably, the engagement and disengagement is effected under fluid-control, a throttling member, e. g. an adjustable valve, being used to control the pressure of the fluid supplied to rams connected with the friction means, while the adjustment of the valve is changed by a time-controlled element, such as a piston moving at a controlled speed. The adjustable valve may be formed by another piston, one face of the same being subject to a gradually increasing force, preferably to that of a biased spring tensioned by the time-controlled piston, the other face being subject to the pressure of the fluid supplied to the ram.

The invention is applicable to transmissions being shifted automatically as well as to transmissions shiftable at the option of an operator. The function of the time-controlled element and of the rams may be governed by a valve or other control member combined with the pressure-controlling valve and the time-controlled element in a common unit.

Further objects of my invention will appear from the description of a preferred embodiment thereof to be described hereinafter with reference to the accompanying drawings, while the features of novelty will be pointed out in the claims.

In the drawings:

Fig. 1 illustrates a more or less diagrammatic section through a hydraulic or fluid-control unit for a transmission represented diagrammatically in Fig. 1a and illustrated in detail in Fig. 5, the various elements being shown in Fig. 1a in a position to set the transmission to "direct gear";

Fig. 2 shows the same view with the elements assuming a position setting the transmission to "high gear";

Fig. 3 depicts the time-controlled element governing the adjustment of the throttle valve, said element being shown in a transitory position intermediate the positions shown in Figs. 1 and 2;

Fig. 4 is a chart illustrating the timed variation of the pressures exerted on the clutch and the brake of the transmission shown in Figs. 1a and 4, while Fig. 5 is an elevation, partly in section of a transmission provided in addition to the orthodox speed change gear of a motor vehicle, the parts assuming the position for "high gear," such transmission being diagrammatically shown in Fig. 1a.

Figure 5:
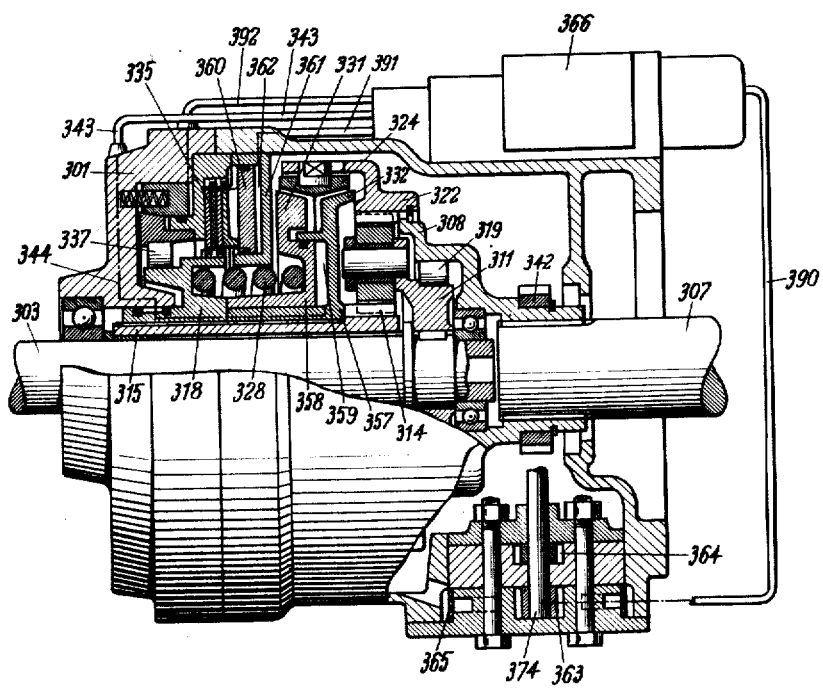

In order to enable the reader to better understand the objects of my invention and the manner in which the same may be reduced to practice, I shall first describe a transmission to which my invention is applicable. Such transmission as illustrated in Fig. 5 forms subject-matter of a co-pending patent application Ser. Number 180,835, filed on August 22, 1950, covering an invention made by Theodor Kümmich, Karl Kollmann and Hans Joachim Max Förster and, therefore, need not be described here in detail.

The driving shaft 303 driven by the engine of a motor car through a speed-change transmission drives a carrier 311 of a set of planetary gears meshing permanently with an outer gear 322 attached to the driven shaft 307 and with an inner sun gear 314 attached to a sleeve 315. The shaft 307 carries a bevel pinion (not shown) driving the rear axle shafts of the motor car. The casing 301 of the supplemental transmission is fixed to the casing (not shown) of the rear axle transmission.

For the purpose of changing the speed transmission from shaft 303 to shaft 307 from "direct" to "high," the sleeve 315 of gear 314 may be disconnected from gear 322 by disengagement of a friction clutch 331, 324, 332 and may be connected to the casing 301 by a second friction means 335 which, in effect, constitutes a brake composed of two laminated and interleaved sets of disks, one set being splined to a ring fixed to the casing 301, while the other set is splined on a bushing 318 fixed to sleeve 315. The friction clutch 331, 324, 332 comprises two frustro-conical elements 331 and 332 relatively movable in axial direction towards and away from one another and an annular member 324 having two internal outwardly flaring faces adapted to co-operate with the conical circumferential faces of the elements 331 and 332, the member 324 being provided with a plurality of outwardly projecting radial studs projecting into longitudinal slots provided in a cylindrical flange integral with gear 322, thus guiding the annular member 324 in axial direction while connecting it with gear 322 for common rotation. An actuating mechanism is provided to engage and to disengage the two friction means alternately. In the embodiment shown this mechanism includes two hydraulic rams each composed of a cylinder and a piston movable therein and a spring mounted to oppose one of said rams.

The ram 362 co-ordinated to the friction means 335 is formed by an annular cylinder 361 fixed to casing 301 and by a piston 360 movable therein and shaped to engage the disks constituting brake 335. The other ram 359 co-ordinated to clutch 331, 324, and 332 is formed by an annular cylinder 357 carrying the conical clutch ring 332 and by an annular piston 358 integral with the conical clutch ring 331. A helical spring 328 abutting against the bushing 318 and surrounding the hub of the member 358 is biassed to move the latter towards the right thus tending to put clutch 331, 324, 332 in engaged condition, unless it is more or less disabled by the admission of pressure-fluid to ram 359.

One-way clutch 319 and one-way brake 337 are provided to maintain a positive power-transmission from shaft 303 to shaft 307 and vice versa under any conditions of operation including the simultaneous disengagement of both friction means, as is explained at greater detail in the co-pending application supra. The one-way brake 337 is normally disabled but will be rendered operative by action of an annular piston movable in a cylinder when fluid under pressure is supplied thereto by a duct 392.

A helical gear 342 on shaft 307 drives a shaft 374 on which two gear pumps 363 and 364 are mounted, such pumps being arranged in series constituting a source of operating fluid for the actuation of the clutch and brake-actuating mechanism.

The control device forming the subject matter of my invention has a casing 366 mounted on casing 301 and connected to the pump 363 by a duct indicated at 390 and to the clutch and brake actuating mechanism by two ducts 343 and 391. The duct 343 is connected with the ram 359 through a set 344 of intercommunicating bores drilled in housing 301, in member 318, and in the hub portion of the cylinder 357. The duct 391 communicates with the ram 362 controlling brake 335 through a set of bores drilled in casing 301 and in cylinder 361. A third duct 392 connects the casing 366 with the auxiliary cylinder serving, when supplied with fluid under pressure, to render the normally disabled one-way brake 337 operative.

It is desirable that when the transmission is to be shifted from "high" to "direct," the brake 335 be disengaged by ram 360, 361 abruptly, while the clutch 331, 324, 332 is gradually and smoothly engaged by action of spring 328 under control by the fluid discharged from ram 359.

Vice versa, when the transmission is to be shifted from "direct" to "high," the friction means 335 should be engaged gradually under timed control, while the clutch 331, 324, 332 is disengaged abruptly.

How these objects can be attained, will now be explained with reference to Figs. 1, 2, 3, and 4.

The casing 366 is provided with two cylindrical cavities 1 and 2 and with a number of ducts communicating with the cavities and with the ducts 343, 390, 391 and 392, respectively. In Fig. 1 the two cavities 1 and 2 and the ducts formed by casing 366 are shown in a diagrammatic fashion. A more detailed illustration is deemed dispensable, since anybody skilled in the art will meet with no difficulty in designing and constructing the control device on the basis of the information to be conveyed hereinafter with reference to such diagrammatic illustration.

The cylindrical cavity 1 accommodates a slide valve designated by 50 as a whole, such valve being formed by a piston resiliently held in one of two positions (Fig. 1) by a helical spring 3 acting on its bottom and adapted to be shifted to the other position (Fig. 2) by actuation of a shaft 51 which may extend out of casing 366 for manual or automatic operation. The valve 50 has four peripheral recesses, recess 52 being in permanent communication with duct 391, recess 53 communicating permanently with duct 343, recess 54 being in permanent communication with a branch 10 of duct 390 supplying the fluid under pressure from the pump 364, and recess 55 communicating permanently with an outlet port 47 discharging into the casing 301 (Fig. 5).

The valve 50 serves to control the communication of those ducts or ports with a second outlet port 45 discharging into the casing 301 (Fig. 5) and with ducts 18 and 37 leading to the cylindrical cavity 2.

The cylindrical cavity 2 in its lower end accommodates a piston 4, and in its upper end a fixed bushing 56 held in position by a split ring 57. The bushing 56 is provided with an axial bore 58, having a plurality of radial ports 59, 13, and 14, with a lengthwise duct 16 leading from port 13 to the upper end of the axial bore 58 and with a recess 61 establishing permanent communication of the space between piston 4 and bushing 56 with an outlet port 15.

As will appear from Fig. 1, port 59 communicates with a branch duct 9 of the pressure line 390, port 13 communicates with the duct 18 and port 14 communicates with the outlet port 15 dischargnig into casing 301 (Fig. 5).

The cylindrical bore 58 accommodates a slide valve of the piston type comprising an upper piston 11 and a lower piston 12 which are connected by a stem 5 and are spaced slightly in excess of the distance of ports 59 and 14.

The piston 4 has a peripheral recess 40 intermediate its ends and a lengthwise duct 43 connecting the recess 40 with the space 42 beneath it. The wall of the cavity 2 has a port 38 spaced from its bottom, and another port 60 permanently communicating with space 42. While port 38 communicates directly with duct 37, port 60 communicates with duct 37 indirectly through a branch 39 in which an adjustable throttle valve 41 is inserted.

A helical spring 6 is interposed between the piston 12 and the valve 4. Another helical spring 7 is interposed between the piston 11 and the top wall of cavity 2.

The operation is as follows:

With the slide valve 50 in the upper position and the pistons 4 and 11, 12 in their lower positions as shown in Fig. 1, oil under pressure is supplied by the pump through lines 390 and 9 leading to the port 59 and through lines 390 and 10 to the recess 54 of valve 50. Port 59 is closed by piston 11. The port 13, however, communicates through the space surrounding shaft 5, and through the port 14 with the outlet port 15. Since port 13 is thus connected with the discharge, the ram 359 is relieved from fluid pressure through ducts 344, 343, recess 53 and duct 18 and permits the spring 328 to maintain clutch 331, 324, 322 (Fig. 5) in engaged condition for "direct gear." Similarly, the space 42 at the bottom of cavity 2 communicates with discharge via ports 38, 60, ducts 39, 37, recess 55 and outlet port 47. The slide valves or pistons 4 and 5, 11, 12 are held by the springs 6 and 7 in the position shown in Fig. 1.

The duct 391 communicates through recess 52 of the slide valve 50 with the outlet port 45. Hence, the brake 335 is released, whereas clutch 331, 324, 332 is engaged. The transmission, therefore, is in "direct gear," its elements 314, 311 and 322 (Fig. 5) revolving as a unit.

When the vehicle has been started and its speed exceeds a certain limit, the slide valve 50 is shifted by shaft 51 to the position shown in Fig. 2 and, as a result, performs three functions:

(1) The recess 54 of the slide valve 50 will connect the pressure line 10 with the ducts 37, 38 and 43 admitting fluid at full pressure beneath piston 4, thus raising the same rapidly until the recess 40 gets out of registry with the port 38. Thereafter, fluid is admitted at a pressure reduced by throttle valve 41 through port 60 beneath piston 4 raising the same slowly. This motion can be accurately timed by adjustment of valve 41.

(2) The recess 53 of the valve 50 will establish a connection between pressure line 10 and the line 343 leading to the ram 359 whereby the latter will be supplied with fluid at full pressure and will abruptly disengage clutch 331, 324, 332 contrary to the force exerted by spring 328.

(3) Line 391 will be cut off from the outlet port 45 and, in lieu, will be connected by recess 52 with duct 18 leading to port 13.

These three functions co-operate to accomplish a smooth gear shifting operation.

The initial rapid elevation of piston 4 is sufficient to cause piston 12 to throttle the outlet through port 14 and to simultaneously cause piston 11 to slightly uncover port 59 whereby fluid under reduced pressure is admitted to port 13 through duct 9 and port 59 and from port 13 through duct 18, recess 52 and line 391 to the ram 362 to engage the friction means 335.

In the chart shown in Fig. 4, the curve $p1$ represents the pressure of the fluid applied to ram 359 whereas the curve $p2$ shows the pressure applied to the ram 362. The instant at which valve 50 was shifted from the Fig. 1 position to the Fig. 2 position is indicated at A. During the first phase lasting from the instant A to the instant C the pressure $p1$ rises quickly via recess 53 until it reaches the maximum shown at the point B while simultaneously piston 4 is run upwardly to cause port 59 to be uncovered. That happens at the instant C. The flow of fluid to line 391 is throttled between the lower edge of piston 11 and the lower edge of port 59. Therefore the pressure prevailing in duct 391 and ram 362 will be determined by the adjustment of valve 5, 11, 12 and in the second phase that adjustment is slowly varied by piston 4 in an accurately timed manner, the slide valve 5, 11, 12 assuming a position in which the upward pressure exerted by the biased spring 6 is balanced by the total of the downward pressure of spring 7 plus the downward fluid pressure exerted on top of piston 11 from port 13 through duct 16. Therefore, an increase in the bias spring 6 by action of piston 4 rising slowly, results in such an adjustment of valve 5, 11, 12 and such a consequent throttling effect as to produce a slowly rising pressure in duct 13. This pressure is communicated to, duct 18, recess 52, and line 391 to the friction means 335.

While the pressure initially attained at D in Fig. 4 as a result of the operations in the first phase is sufficient to take up any lost motion in brake 335, it permits the brake to slip. In the second phase up to the instant E in Fig. 4, the pressure $p2$ is gradually increased by reason of the adjustment of valve 5, 11, 12 by the rising piston 4, until the brake ceases to slip. At the time E the lower edge of piston 4 uncovers port 38 admitting unthrottled pressure beneath piston 4 raising the same quickly to its topmost position. Therefore, the pressure $p2$ rises quickly in the third phase within the interval from E to F, applying additional pressure upon brake 335 to firmly hold the same in engaged condition.

The length of the second phase from D to E depends on the speed of piston 4 and, therefore, may be determined by suitable adjustment of the throttle valve 41. The interval may amount to from one to two seconds.

For shifting the transmission back from "high" to "direct," valve 50 must be returned from its Fig. 2 position to its Fig. 1 position either automatically, when the speed of the vehicle drops below a certain rate, or manually at the option of the driver. When this happens at the instant G in Fig. 4, valve 50 performs the following functions:

(1) Ram 362 is connected with exhaust via duct 391, recess 52 and outlet port 45 whereby pressure $p2$ drops abruptly from G to H thus releasing friction means 335.

(2) Ram 359 is connected to port 13 via duct 343, recess 53 and duct 18, the full pressure still being maintained therein.

(3) The space 42 beneath piston 4 is connected through port 38, duct 37 and recess 55 with outlet port 47. As a result, piston 4 drops abruptly until it covers port 38. The pressure prevailing in port 13 communicated to ram 359 is reduced accordingly from J to K in Fig. 4. Thereupon under the force of spring 6 acting on piston 4 the fluid will be discharged from space 42 slowly through the throttle valve 41 lowering piston 4 and the pressure controlled thereby in port 13 gradually up to point L. When that point is reached, recess 40 will arrive in registry with port 38 permitting of a quick relief of space 42 from fluid pressure causing piston 4 to drop abruptly producing a similar drop in the pressure prevailing in port 13. That is indicated in Fig. 4 by the sharp drop of pressure $p1$ from L to M.

The engaging force exerted by spring 328 on the clutch 331, 324, 332 is indicated by the distance f in Fig. 4. It will appear that the timed control of this force f is similar to that of pressure $p2$. Hence, it will result in a smooth engagement of clutch 331, 324, 332.

From the foregoing explanation it will be readily appreciated that the two rams 359 and 362 each comprising a cylinder and a piston constitute a power-driven friction-means actuating mechanism which is adapted to produce an actuating force acting alternatively on one or the other of the two friction means engaging or disengaging the same. More strictly speaking, the spring 328 forms part of the clutch actuating mechanism, because it moves clutch 331, 324, 332 to engaging position under control by ram 359.

The actuating mechanism 328, 359, 362 is controlled by valve 5, 11, 12 which determines the friction-means actuating force produced thereby. Viewed from a broader aspect, valve 5, 11, 12 therefore, represents an adjustable power-control member. The control member is connected by spring 6 for adjustment with a time-controlled element in form of piston 4.

While I have described my invention with reference to a preferred embodiment thereof, I wish it to be clearly understood that it is not limited to the details thereof but is capable of numerous modifications within the scope of the appended claims.

Thus, the clutch and brake actuating mechanism need not be necessarily actuated by fluid pressure but can be actuated otherwise. Nor need it necessarily comprise two separate actuators 359 and 362 for the two friction means. In the co-pending application, supra, a transmission is disclosed in which a single actuator is operative when moving in one direction to disengage one friction means and engage the other and when moving in the opposite direction to act reversely. Nor is it necessary that the adjustable power control member and the time-controlled element adjusting the same be formed by valves or pistons, unless the clutch and brake actuating mechanism is of the hydraulic type. While in the embodiment shown the source of pressure fluid is so designed that ducts 9 and 10 are supplied with fluid from the same pump, they may be supplied by separate pumps.

What I claim is:

1. A device for the automatic control of friction means, comprising in combination a power driven actuator operative to produce an actuating force for the engagement of said friction means, an adjustable power control member for controlling said actuator, a source of power providing an actuating force, connecting means connecting said power driven actuator with said source through said power control member including means for reducing said actuating force supplied by said source, a time-controlled element movable under the influence of a force and adapted during movement thereof to control the rate of engagement of said friction means by said power-driven actuator, means for reducing the strength of said last-mentioned force during the largest part of movement of said time controlled element, and means operatively connecting said time controlled element with said power control member and said first-mentioned reducing means, to provide timed adjustment of said actuator to first move said friction means into slight engagement, to thereupon build up friction at a slow rate to a value at which said friction means ceases slipping, and to subsequently increase said friction well beyond said value.

2. The device according to claim 1, wherein said last-mentioned means provide timed adjustment of said actuator to first move said friction means into slight engagement at a fast rate.

3. The device according to claim 1, wherein said power driven actuator includes a fluid-operated ram and wherein said source of power is a pump driven by the vehicle, and said first-mentioned reducing means is an adjustable valve.

4. A device for the automatic control of a friction means, comprising in combination a power-driven actuator including a fluid-operated ram, a source of operating fluid, a duct connecting said source with said ram, an adjustable valve in said duct for determining pressure of the operating fluid admitted from said source to said actuator, a time-controlled element movable under the influence of a force, means for reducing the strength of said force during the largest portion of movement of said time-controlled element, and means actuated by said time-controlled element and operative to perform timed adjustment of said valve to cause said actuator to first move said friction means into slight engagement, to thereupon build up friction at a slow rate to a value at which said friction means ceases slipping and to subsequently increase the friction produced by said actuator well beyond said value, said power-driven actuator including a spring cooperating with said ram and adapted to move the same in a direction opposite to the force produced by said operating fluid.

5. In a control system for a variable speed transmission having two friction means for the operation of gears, the combination comprising a power-driven actuating mechanism co-ordinated to the friction means and adapted to produce an actuating force acting alternatively on one or the other of the same, at least one adjustable power-control member adapted to control said actuating mechanism and to determine the actuating force produced thereby, a movable time-controlled element, means adapted to be actuated by said time-controlled element and to perform timed adjustment of said power-control member causing said actuating mechanism to move one of the friction means first to slight engagement, to then gradually build up friction therein to a value at which the friction means ceases slipping and to subsequently increase said friction well beyond said value, and a movable member co-ordinated to both said time-controlled member and said actuating mechanism, and adapted to perform the dual function of rendering said time-controlled element operative to cause said power-control member to engage one of the friction means and of causing said actuating mechanism to quickly disengage the other one of the friction means.

6. The combination set forth in claim 5 in which said actuating mechanism comprises two fluid-operated rams, one for each of the friction means, and at least one spring mounted to counteract one of said rams.

7. In a control system for a variable speed transmission having two friction means for the operation of gears, the combination comprising a power-driven actuating mechanism co-ordinated to said friction means and adapted to produce an actuating force acting alternatively on one or the other of the same, at least one adjustable power-control member adapted to control said actuating mechanism and to determine the actuating force produced thereby, a movable time-controlled element, means adapted to be actuated by said time-controlled element and to perform timed adjustment of said power-control member causing said actuating mechanism to move one of the friction means first to slight engagement, to then gradually build up friction therein to a value at which the friction means ceases slipping and to subsequently increase said friction well beyond said value, and a movable member co-ordinated to both, said time-controlled member and said actuating mechanism and adapted to perform the dual function of rendering said time-controlled element operative to cause said power-control member to move one of the friction means to slight engagement and of simultaneously causing said actuating mechanism to quickly disengage the other one of the friction means.

8. In a control system for a variable speed transmission, the combination comprising two friction means for the selective operation of gears, a power-driven actuating mechanism co-ordinated to said friction means and adapted to produce an actuating force acting alternatively on one or the other of the same, said mechanism including two fluid-operated rams, one for each of said friction means, and at least one spring mounted to counteract one of said rams, a source of operating fluid, a duct connecting the latter with said actuating mechanism, an adjustable valve in said duct adapted to determine the pressure of the operating fluid admitted from said source to said actuating mechanism, a movable time-controlled element, means adapted to be actuated by said time-controlled element and to perform timed adjustment of said valve to cause said actuating mechanism to move one of the friction means first to slight engagement, to then gradually build up friction therein to a value at which the friction means ceases slipping and to subsequently increase said friction well beyond said value, and a second valve communicating with both, said mechanism and said time-controlled element and adapted to perform the dual function of causing said fluid to operate said time-controlled element whereby said valve brings about the engagement of one of the friction means, and of simultaneously causing said actuating mechanism to quickly disengage the other one of the friction means.

9. In a control system for an epicyclic gear having three gear elements mounted for rotation about a common axis, a first friction means for arresting one of the elements, a second friction means for coupling the latter with one of the two other elements, a power-driven actuating mechanism co-ordinated to the friction means and adapted to produce an actuating force acting alternatively on one or the other of the same, at least one adjustable power-control member adapted to control said actuating mechanism and to determine the actuating force produced thereby, a movable time-controlled element connected with said adjustable power-control member and adapted, when operative, to effect an adjustment thereof which causes said actuating mechanism to move one of the friction means first to slight engagement, to then gradually build up friction therein to a value at which the friction means ceases slipping and to subsequently increase said friction well beyond said value, and a movable member co-ordinated to both, said time-controlled member and said actuating mechanism and adapted to perform the dual function of rendering said time-controlled element operative to cause said power-control member to engage one of the friction means and of causing said actuating mechanism to quickly disengage the other one of the friction means.

10. In a control system for a variable speed transmission having two friction means for the selective operation of gears, the combination comprising a first hydraulic actuator co-ordinated to one of the friction means, a second hydraulic actuator co-ordinated to the other one of the friction means, a pump, an adjustable valve connected with said pump and adapted to control the pressure of a fluid fed by the same, a movable time-controlled element, means adapted to be actuated by said time-controlled element and to perform timed adjustment of said valve to cause a variation of the pressure of the fluid discharged from said valve, and a second valve capable of assuming two positions and adapted in one position to perform the three functions of starting forward motion of said time-controlled element, of connecting said adjustable valve with said first hydraulic actuator for timed operation thereof and of connecting said second hydraulic actuator for rapid actuation with one of two ducts connected with said pump and with an outlet, respectively, said second valve being adapted in the other one of its two positions to perform the three functions of starting the return motion of said time-controlled element, of connecting said adjustable valve with said second hydraulic actuator for timed operation thereof, and of connecting said first hydraulic actuator for rapid hydraulic actuation with one of said two ducts.

11. In a control system for a variable speed transmission having two friction means for the selective operation of gears, the combination comprising a first hydraulic actuator coordinated to one of the friction means, a second hydraulic actuator coordinated to the other one of the friction means, a pump, an adjustable valve connected with said pump and adapted to control the pressure of a fluid fed by the same, a time-controlled piston, a cylinder accommodating said piston provided with ports, ducts being provided to connect said ports to said pump and to an outlet, a spring adapted to be tensioned by said piston in a timed manner and to act on said valve to determine the pressure of the fluid discharged from said valve, and a second valve controlling said ducts and being capable of assuming two positions, being adapted in one position to perform the three functions of admitting fluid from said pump to said piston to produce time-controlled forward motion thereof, of connecting said adjustable valve with said first hydraulic actuator for timed operation thereof, and of connecting said second hydraulic actuator for rapid actuation with one of two ducts connected with said pump and with an outlet respectively, said second valve being adapted in the other one of its two positions to perform the three functions of connecting said cylinder to said outlet to thereby cause time-controlled return motion of said piston, of connecting said adjustable valve with said second hydraulic actuator for timed operation thereof, and of connecting said first hydraulic actuator for rapid hydraulic actuation with one of said two ducts.

12. In a control system of the character described the combination comprising two hydraulic actuators for friction means, a source of pressure fluid, an adjustable valve connected with said source and operative to reduce the pressure of said fluid depending on the adjustment thereof, a second-valve for alternately connecting said adjustable valve with one or the other of said hydraulic actuators, a piston operable by said fluid, spring means connecting said piston with said adjustable valve for changing the adjustment thereof, and a throttle valve interposed between said source and said piston to reduce the pressure of the fluid acting on said piston during the largest part of the piston stroke.

13. In a control system of the character described, the combination comprising a hydraulic actuator for friction means, a source of pressure fluid connected with said actuator for actuating the same, an adjustable throttle valve connected with said source and, depending on its adjustment, varying the pressure of said fluid, a time-controlled element movable under the influence of a force, means for directly reducing said last-mentioned force during the largest portion of movement of said time-controlled element, and means actuated by said time-controlled element to perform timed adjustment of said valve to thereby provide only gradual engagement of said friction means by said actuator depending on the pressure of said fluid as determined by said adjustable valve.

14. A device for the automatic control of a friction means, comprising in combination a power-driven actuator including a fluid-operated ram, a source of operating fluid, a duct connecting said source with said ram, an adjustable valve in said duct for determining pressure of the operating fluid admitted from said source to said actuator, a time-controlled element movable under the influence of a force, means for reducing the strength of said force during the largest portion of movement of said time-controlled element, and means actuated by said time-controlled element and operative to perform timed adjustment of said valve to cause said actuator to first move said friction means into slight engagement, to thereupon build up friction at a slow rate to a value at which said friction means ceases slipping and to subsequently increase the friction produced by said actuator well beyond said value, said time-controlled element comprising a cylinder with a piston movable therein, inlet duct means connected with said cylinder for conducting thereto a hydraulic pressure medium, control means in said piston and cooperating with said inlet duct means to effect movement of said piston by said hydraulic medium to initially effect a fast movement of said piston over a relatively small portion of the piston stroke, to thereupon effect a slow movement of said piston and to finally again effect a fast movement of said piston near the end of said piston stroke, and increasing force being applied against said adjustable valve during said piston stroke.

15. The combination according to claim 14, wherein said inlet duct means comprises a first duct connected with said cylinder, said first duct being in constant communication with the inside of said cylinder and including a throttling means, and a second duct connected with said cylinder at a point traversed by said piston and providing a substantially unthrottled passage for said hydraulic medium up to said cylinder, and wherein said control means in said piston includes a channel to provide unthrottled flow therethrough of said hydraulic medium from said second duct into said cylinder during said first-mentioned piston stroke portion, to thereupon provide flow of said hydraulic medium only through said throttled first duct upon closing of said second duct by said piston, and to finally provide again unthrottled flow of said hydraulic medium through said second duct and to thereby determine the speed of said piston stroke.

16. The combination according to claim 14, further comprising second friction means with a second actuator, further control means, a pressure line connecting said adjustable valve with said further control means, and duct means connecting said further control means with each of said actuators, said control means being operative to control the connections with said last-mentioned duct means to provide for increasing pressure in one of said actuators and for decreasing pressure in the other of said actuators during one piston stroke of said time-controlled element.

17. In combination with a change-speed gear having two friction means, each of said friction means being adjustable from a disengaged condition to an engaged condition with one of said friction means being engaged while the other of said friction means is disengaged and vice versa, a control means for engaging the disengaged friction means and for disengaging the engaged friction means, and timing means connected with said control means for effecting relative rapid disengagement of the previously engaged friction means and for effecting initially relative rapid slight engagement of the previously disengaged friction means to produce slipping engagement thereof, to thereupon further increase engagement of the previous disengaged friction means at a relatively slow rate to a point at which slippage ceases, and to finally increase further engagement of the previously disengaged friction means well beyond said point.

18. In combination with a change-speed gear having two friction means, each of said friction means being adjustable from a disengaged condition to an engaged condition with one of said friction means being engaged while the other of said friction means is disengaged and vice versa, a control means for engaging the disengaged friction means and for disengaging the engaged friction means, and timing means connected with said control means for effecting in cooperation with said control means relative rapid disengagement of the previously engaged friction means and for effecting engagement of the previously disengaged friction means in three successive stages having successively different rates of engagement.

References Cited in the file of this patent

UNITED STATES PATENTS

| | | |
|---|---|---|
| 843,076 | Detrick | Feb. 5, 1907 |
| 1,566,111 | Miller | Dec. 15, 1925 |
| 1,869,085 | Williamson | July 26, 1932 |
| 2,009,301 | Rode | July 23, 1935 |
| 2,095,779 | Whittington | Oct. 12, 1937 |
| 2,097,021 | Normanville | Oct. 26, 1937 |
| 2,193,305 | Thompson | Mar. 12, 1940 |
| 2,214,201 | Moulder | Sept. 10, 1940 |
| 2,254,335 | Vincent | Sept. 2, 1941 |
| 2,328,091 | Nutt et al. | Aug. 31, 1943 |
| 2,329,092 | Nutt | Aug. 31, 1943 |
| 2,338,546 | Sholl | Jan. 4, 1944 |
| 2,370,859 | Hale | Mar. 6, 1945 |
| 2,386,220 | Lawler | Oct. 9, 1945 |
| 2,409,506 | McFarland | Oct. 15, 1946 |
| 2,437,517 | Greenlee | Mar. 9, 1948 |
| 2,461,218 | Lapsley | Feb. 8, 1949 |
| 2,575,522 | McFarland | Nov. 20, 1951 |
| 2,693,260 | Lucia | Nov. 2, 1954 |
| 2,774,257 | Tyler | Dec. 18, 1956 |

Disclaimer 2,807,968.—*Hans J. M. Förster*, Harthausen a. F., Kreis Esslingen am Neckar, Germany. DEVICE FOR THE AUTOMATIC CONTROL OF A FRICTION CLUTCH OR BRAKE OR THE LIKE. Patent dated Oct. 1, 1957. Disclaimer filed Apr. 25, 1962, by the assignee, *Daimler-Benz Aktiengesellschaft*.
Hereby enters this disclaimer to claims 5, 6, 7, 8, 9, 13, and 17 of said patent.
[*Official Gazette June 12, 1962.*]